(12) United States Patent
Randall

(10) Patent No.: US 10,213,055 B1
(45) Date of Patent: Feb. 26, 2019

(54) THIN CHOPPING AND SLICING BOARD THAT FACILITATES EASY TRANSFER OF PREPARED INGREDIENTS

(71) Applicant: David Awrey Randall, Springfield, MO (US)

(72) Inventor: David Awrey Randall, Springfield, MO (US)

(*) Notice: Subject to any disclaimer, the term of this patent is extended or adjusted under 35 U.S.C. 154(b) by 0 days.

(21) Appl. No.: 15/856,018

(22) Filed: Dec. 27, 2017

(51) Int. Cl.
*A47J 47/00* (2006.01)
*A47J 43/00* (2006.01)

(52) U.S. Cl.
CPC .............. *A47J 47/005* (2013.01); *A47J 43/00* (2013.01)

(58) Field of Classification Search
CPC .......... A47J 47/00; A47J 47/01; A47J 47/005; A47J 43/00; B26D 7/0006
USPC ........... 269/284 R, 302.1, 14, 289, 303, 313, 269/289 R
See application file for complete search history.

(56) References Cited

U.S. PATENT DOCUMENTS

| | | | | |
|---|---|---|---|---|
| 5,203,548 A * | 4/1993 | Sanders | ................ | A47J 47/005 269/289 R |
| 5,472,790 A * | 12/1995 | Thompson | ............ | A47J 47/005 428/220 |
| 5,501,441 A * | 3/1996 | Kegley | ................. | A47J 47/005 269/13 |
| 9,155,427 B1 * | 10/2015 | Kumar | .................. | A47J 47/005 |
| 2007/0007705 A1 * | 1/2007 | Chen | ..................... | A47J 47/005 269/289 R |
| 2009/0194925 A1 * | 8/2009 | Rolf | ....................... | A47J 47/005 269/302.1 |
| 2009/0283952 A1 * | 11/2009 | Sellers | .................. | A47J 47/005 269/289 R |
| 2014/0251866 A1 * | 9/2014 | Smallman | ................ | B65D 1/34 206/557 |
| 2016/0183733 A1 * | 6/2016 | Lee | ....................... | A47J 47/005 269/13 |

* cited by examiner

Primary Examiner — Sean K. Hunter
Assistant Examiner — Thomas Raymond Rodgers

(57) ABSTRACT

A method using thin material such as plastic to create a flat food preparation surface of suitable size. Any durable, hygienic, and easily-cleaned substance may be utilized. The sheet is adapted by inclusion of perforations to serve has handles as well as longitudinal scoring or similar features to control site of folding. The perforations may be of different shapes and scoring of different lengths and positions in varying embodiments. Reinforcement with hinges at the scorings may be included in certain embodiments. Grasping and bringing together the handles folds the sheet into a predictable shape to allow foods to be easily directed to a recipient vessel of any dimension.

2 Claims, 3 Drawing Sheets

Figure 3:
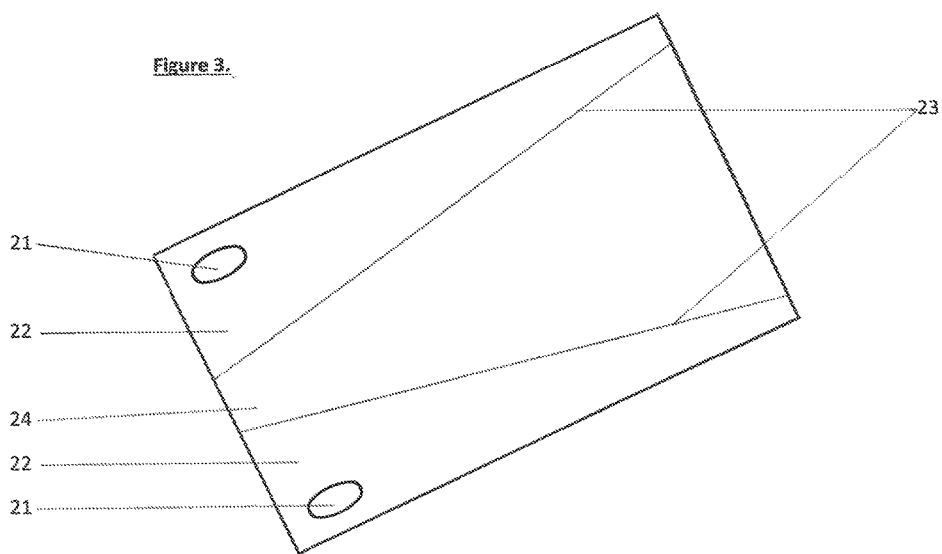

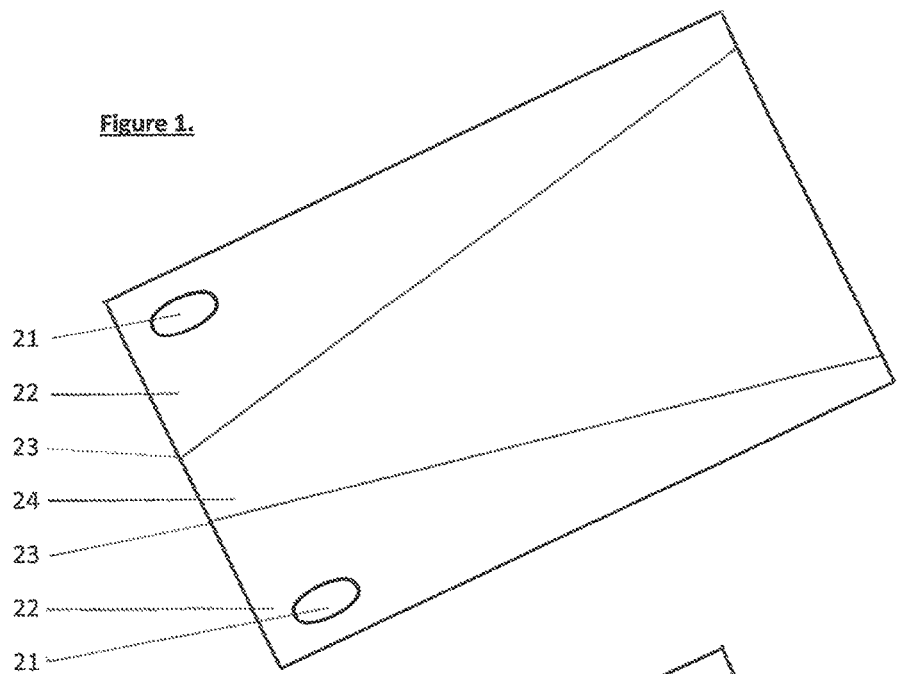
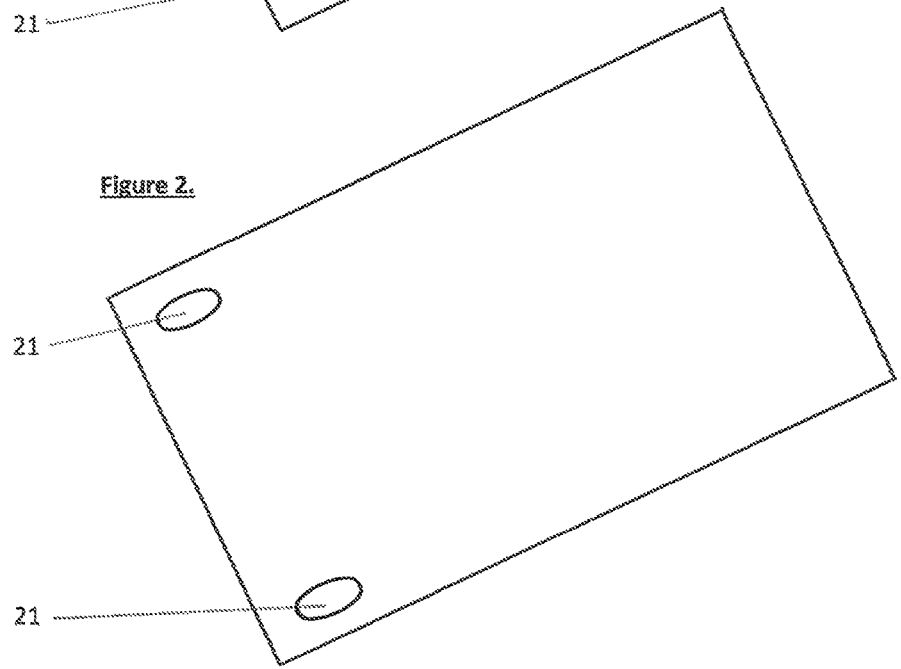

THIN CHOPPING AND SLICING BOARD THAT FACILITATES EASY TRANSFER OF PREPARED INGREDIENTS

CROSS REFERENCE TO RELATED APPLICATIONS none

TECHNICAL FIELD

The present invention relates to systems, methods and apparatus for the preparation of food and, more specifically a surface on which to cut, chop, and otherwise process ingredients with means to easily transfer them to a variety of receiving vessels without spillage.

International classification: A47J 43/00; A47J 47/00; A 47J 47/005; B26D 7/0006

United States classification: 269/302.1; 269/14; 269/289; 269/303; 269/313

Field of classification search: A47J 47/005; A47J 43/00; A47J 47/00; B26D 7/0006; 269/14; 269/289; 269/302.1; 269/303; 269/313

| References cited: | | |
|---|---|---|
| 468,175 | 1891 | Larkins |
| 952,313 | 1910 | Droz |
| 1,251,026 | 1917 | Hitchcock |
| 1,627,583 | 1927 | Thum |
| 1,776,961 | 1928 | Vielbig |
| 2,609,024 | 1952 | Russ |
| 2,796,902 | 1957 | Mercury |
| 2,812,784 | 1957 | Palmer |
| 2,935,107 | 1960 | Bertelson |
| 3,371,694 | 1968 | Miller |
| 3,598,164 | 1971 | August |
| 4,108,222 | 1976 | Kaufman |
| 4,041,964 | 1977 | Shamoon |
| 4,108,222 | 1978 | Kaufman |
| D 252507 | 1982 | Wooldridge |
| D 265,537 | 1982 | Stockdale |
| 4,440,385 | 1984 | Kingery |
| 4,447,051 | 1984 | Price |
| 5,203,548 | 1993 | Sanders |
| 5,472,790 | 1995 | Thompson |
| D 363,195 | 1995 | Bransby |
| 5,501,441 | 1996 | Kegley |
| 2003/0097915 A1 | 2003 | Chen |
| 6,371,470 B1 | 2002 | Ward |
| 2003/0097915 A1 | 2003 | Chen |
| 6,536,753 B1 | 2003 | Keener |
| 6,994,335 B2 | 2006 | Porchia |
| 2006/0131372 A1 | 2006 | Bostick |
| 2007/0007705 A1 | 2007 | Chen |
| 7,077,392 B2 | 2006 | Siegel |
| 7,329,932 B2 | 2008 | Bostick |
| 2010/0314814 A1 | 2010 | Zeitlin |
| CN 102406466 A | 2012 | Chen (Chinese patent) |
| 8,141,860 B2 | 2012 | Goldman |
| D677,130 S | 2013 | Robinson |
| D 700,024 | 2014 | Munson |
| 8,770,562 B1 | 2014 | Blum |
| D 795,028 S | 2017 | Vanatti |

Examples of Commercially Available Sponge Packs Cutting Boards

Counter Maid, the Reusable Flexible Kitchen Board
Chop & Chop New Advanced Products Flexible Cutting Board

BACKGROUND OF INVENTION

People enjoy eating, and particularly appreciate creative and delicious foods. Even simple recipes require a number of ingredients. These constituent parts often need preparation such as slicing and chopping. Afterward, transfer to vessels such as bowls and jars becomes necessary for further cooking progress. Any chef will have experienced the difficulty of collecting these ingredients efficiently and moving them off the cutting surface without spillage, waste, or mess. Cooks often accomplish these tasks on cutting boards that may be moved for convenience and cleaning. Unfortunately, these boards generally fail to enhance ease of such transfer. This invention offers a simple means to overcome the above difficulties. It provides a lightweight and hygienic design that requires minimal storage space and may be easily and inexpensively manufactured.

REVIEW OF PRIOR ART

Food preparation may be accomplished on most any surface. Desirable characteristics include texture and hardness that allows manipulation and stabilization of the ingredient being worked upon. It must avoid dulling of any blade or utensil being used. Such a surface must allow for hygienic cleaning. Some cooks use a large butcher-block type surface while many prefer a smaller cutting board. Extrusion technology for plastic and similar materials has allowed production of thin but durable sheets of variable sizes for the same purpose.

Wooden and plastic substances comprise the majority of such items. Glass and other hard materials are also available. These boards are most frequently rectangular and sized to match the food being prepared. A multitude of other shapes, including ornamental, has been described. Foodstuffs must be transferred after preparation. This can be easily accomplished to a large receptacle but becomes more of a challenge for smaller bowls and, particularly, the mouth of a bottle. Such difficulty increases work for the cook as well as the likelihood of wasted or spilled ingredients. Lifting a heavy cutting board with one hand while pushing foods off of it with the other can become unwieldy and potentially unsafe.

Various Means to Directed Prepared Food to Another Vessel

A plethora of means has been described to facilitate food transfer. Some simply involve placing a receiving vessel beneath the cutting board. (D677,130 S; D700,024 S) The Robinson patent has a semicircular cutout at one end and legs to allow a bowl to be placed beneath it. (D677,130 S) Murison describes a rectangular board with legs, raised edges, and a hole near one corner for similar transfer. (D 700,024 S) Drawbacks for those with such supports include increased complexity of manufacture, particularly for retracting/foldable legs; those with fixed supports require additional storage space. The absence of legs, however, may result in the cumbersome ergonomics wherein the cook must hold the board with one hand and push food with the other. Alternately, the board may be rested atop a bowl but this arrangement may be unstable and prone to tipping.

Others incorporate the receiving vessel in the patent design itself. (U.S. Pat. Nos. 2,609,024; 2,796,902; 3,598,164; 4,041,964; 6,371,470 B1; 6,536,753 B1) The August and Sharron boards rest atop the sink, each with a hole and a receptacle that fits into it. (U.S. Pat. Nos. 3,598,164, 4,041,964) Ward offers a similar counter-top approach. (U.S. Pat. No. 6,371,470 B1). Some have a tray or pan receptacle (U.S. Pat. Nos. 3,598,164; 2,609,024) In the Keener design, food is pushed to one end of the board and into an integral bin that may be removed. (U.S. Pat. No. 6,536,753 B1) Each of these devices occupies more storage space than a simple, planar cutting board. Again, the multitude of parts increases complexity and cost of manufacture.

Many patents incorporate a longitudinal folding feature, effectively creating a trough along which foods may be guided in to a bowl. (U.S. Pat. Nos. 1,776,961; 2,935,107; CN 102406466 A; U.S. Pat. No. 5,203,548) Some simply bend along the center of their length. (U.S. Pat. No. 2,935,107; CN 102406466 A; U.S. Pat. No. 5,203,548) Vielbig's design has multiple longitudinally hinged strips of material rather than having a single folding point.

Other, more elaborate methods of collecting foodstuffs have been described. (U.S. Pat. Nos. 468,175; 952,313; 1,251,026; 3,371,694; D 262,507; D 265,537; U.S. Pat. Nos. 4,440,385; 4,447,051; D 363,195; U.S. Pat. Nos. 6,164,478; 6,994,335 B2; 7,077,392 B2; 7,392,932 B2; 8,141,860 B2; D 795,023 S; U.S. Pat. No. 8,770,562 B1) Many resemble non-culinary devices intended to collect and then direct transfer of various materials. (U.S. Pat. No. 952,313; 2,812,748; 4,440,385) Two food devices incorporate an actual funnel at one end of their ends. (U.S. Pat. No. 468,175; D 265,537) Many of the above are pentagonal and have raised edges on one or more sides. At one end, the elevated sides are angled toward each other in a V configuration with a space between them through which food is pushed. Others essentially use a pouring spout at one end or one corner. Some are constructed of a flat thin material and must be folded along their scored edges to elevate the raised sides. (D 262,507; U.S. Pat. No. 6,164,478) Miller invented a combination scoop and cutting board (U.S. Pat. No. 3,371,694) The Kingery design allows the central, hinged portion of the board to drop down when lifted by its handle, creating a shallow trough to direct food (U.S. Pat. No. 4,440,385) A different approach uses a corralling device similar to a bulldozer blade but semilunar in shape to push food off the end of a cutting board (2010/0314,841 A1) Disadvantages of these involve their complexity. Some require assembly to raise their edges. Most require more storage space than a flat cutting board.

Very lightweight designs have been described. Portia patented a disposable corrugated board similar to cardboard with two longitudinal creases to allow a tri-fold bending to direct prepared foods. (U.S. Pat. No. 6,994,335 B2) Current technology has produced both patented and commercially available cutting boards of thin but durable material. (U.S. Pat. Nos. 5,203,548; 5,472,790; 5,501,441; 6,164,478; 2003/0097915 A1 6,994,335 B2; 2007/00077,705 A1; 7,392,932 B2; 8,141,860 B2; Chop and Chop—New Advanced Products Flexible Chopping Mat; Counter Maid—The Reusable Flexible Kitchen Board) These offer economic production, increased ease of storage, and may be semi-disposable. Some are simply sheets of plastic or similar material. (U.S. Pat. No. 5,472,790; Chop and Chop—New Advanced Products Flexible Chopping Mat; Counter Maid—The Reusable Flexible Kitchen Board) The cook may flex them along their longitudinal axis to direct transfer of food. A disadvantage is that they create a relatively wide, rounded central trough which may make it difficult to move ingredients to a narrow receptacle such as a bottle. Owing to the lack of handles and strong tendency to spring back to a flat shape, they can be unwieldy—particularly as cooking preparation may leave them wet and slippery. Most chefs have experienced these difficulties as well as the associated episodic spill, waste, and mess.

Several modifications of the basic thin cutting board have been devised. One involves a thin plastic sheet with multiple longitudinal scorings on the undersurface that can be folded like the plain, thin sheet boards (2003/0097915 A1). This has the same problem as the plain plastic sheet with a wide trough area which would make transfer to a narrow-neck vessel challenging. Kegley modified an ice-cream cone carrier and essentially added a handle to two opposing corners of the basic thin chopping sheet. (U.S. Pat. Nos. 1,627,583; 5,501,441) The cook grasps the handles and folds the sheet up and around the food. However, when the handles are held together with one hand, the contents of the board become relatively inaccessible from the top, making transfer harder to accomplish. The Sanders device offers a longitudinally tri-folding design with a handle. Drawbacks include a small cutting surface and a relatively wide central trough which would make transfer to a bottle or other narrow vessel more difficult. (U.S. Pat. No. 5,203,548)

LEGEND OF PARTS OF FIGURES

21. Perforations functioning as handles.
22. Outer portions of cutting board that fold upward to provide raised edges/walls to contain food when folded upward.
23. Scoring or similarly functioning feature oriented longitudinally but obliquely to allow the outer portions/sides (22) to fold up along defined lines.
24. Central portion of board. As the sides fold upward, this becomes the floor of the trough along which prepared food is pushed or guided for transfer to another vessel.

LIST OF FIGURES

FIG. 1. Side A of cutting board,

FIG. 2. Side B of cutting board.

FIG. 3. Identical to FIG. 1. Repeated on this page for ease of visual comparison with FIGS. 4 and 5.

Figure 4:
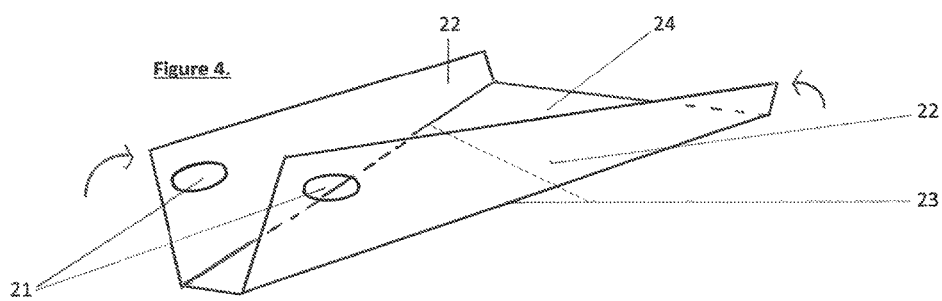

FIG. 4. Sides of cutting board partially folded up.

Figure 5:
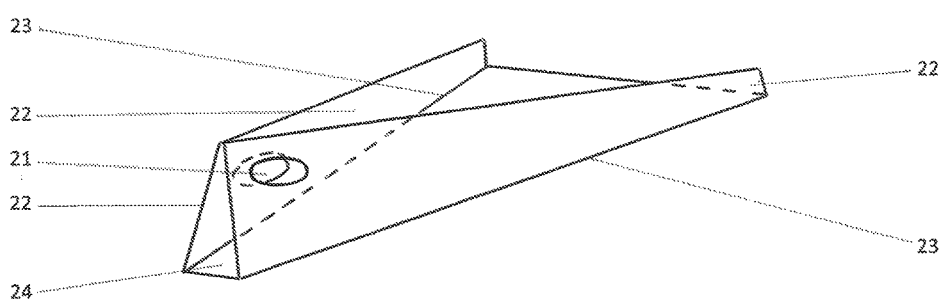

FIG. 5. Sides of cutting board folded upward and ready to pour/transfer prepared food. The cook would grasp the handles and use the other hand to guide/push food toward the narrow end.

Figure 6:
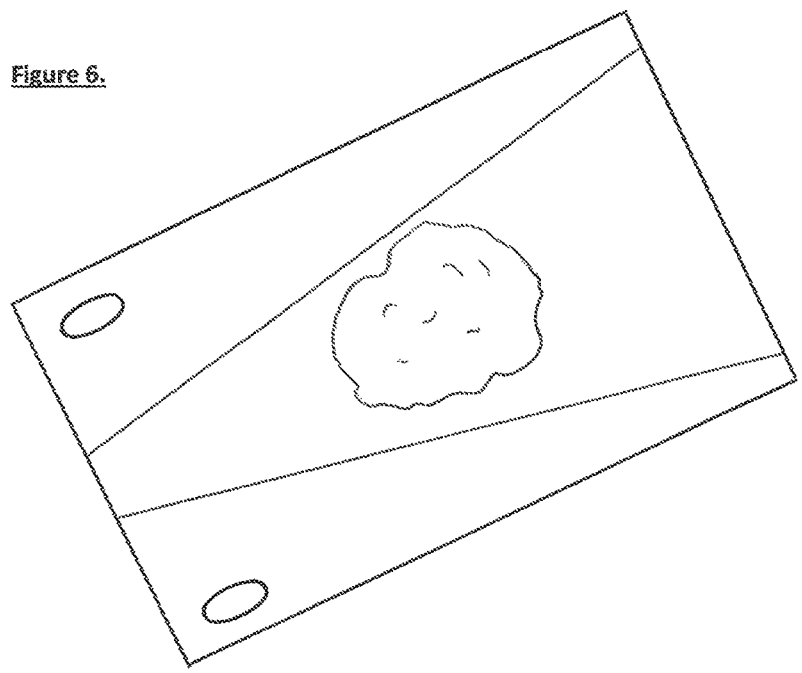

FIG. 6. Identical to FIG. 1 and FIG. 3 with labels of parts omitted. Prepared/chopped food on cutting board.

Figure 7:
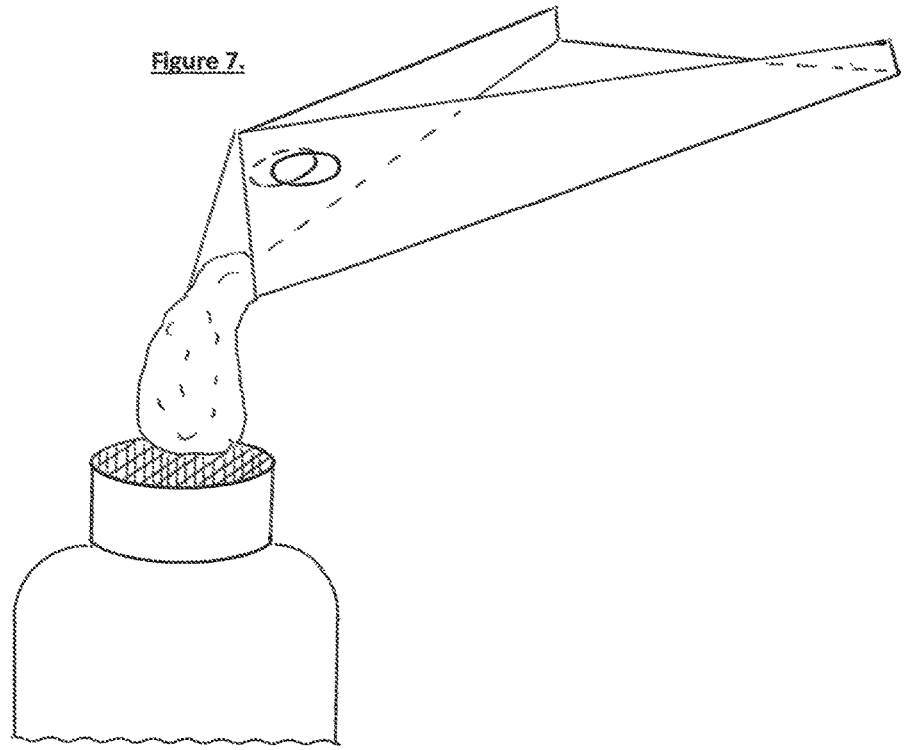

FIG. 7. Identical to FIG. 5 with labels of parts omitted. Prepared/chopped food being poured/transferred to a narrow-necked vessel.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, embodiments of the present invention provide a system, a method, and apparatus to facilitate preparation (cutting, chopping, crushing) of foods on a flat surface with a design that allows transfer to virtually any-dimensioned bowl or other receiving vessel. Further, it seeks to accomplish this in an economic fashion with simplicity of design.

In one embodiment, the cutting board would be produced from a thin, flexible sheet of material such as plastic with durable nature and hardness suitable for cutting without dulling a knife or other utensil. Essential qualities include ease of washing as well as resistance to harboring microorganisms. Size may be varied according to the intended food preparation. It incorporates perforations or other features to allow the cook to grasp it easily. Diagonal scoring allows controlled folding at specific areas to result in the desired shape for transferring food. An alternate embodiment incorporates hinges to reinforce the edges of the cutting surface at the site where they adjoin the scoring or similar lines that control folding. These may be manufactured by existing methods known to those skilled in the art.

Use of this Cutting Board
1. FIG. 6 depicts the cutting board in a flat configuration with food being prepared on top of it.
2. FIG. 7 depicts the board in its folded configuration. The cook grasps the handles, positions it over the receiving vessel (a bottle is illustrated in this figure) to allow the foodstuff to be transferred/poured/pushed into the vessel

SUMMARY OF ADVANTAGES OVER PRIOR ART

The various embodiments of this invention provide solutions to difficulties with food preparation and transfer encountered with existing cutting boards:
1. Many existing cutting boards incorporate legs, collecting bins, and other features that increase bulk. The thin nature of this invention requires minimal storage space—less than even the typical planar board of approximate half inch thickness.
2. The single piece design results in simple and economic manufacture by methods presently available.
3. The present device offers much more controlled food transfer than the plain, flexible sheet and other bendable boards referenced above.
4. The Kegley patent (U.S. Pat. No. 5,501,441) takes a basic thin sheet cutting board and adds perforation handles at two opposing corners. This allows the cook to grasp and fold the device in half. Disadvantages include the lack of control of the width of the central trough created by folding. The cook has limited access to push or direct prepared foods along its length because of the way it folds together. The invention proposed in this present application creates a funnel effect of specific width. The side opposite the funnel end allows easy access for the cook to move the prepared foods.
5. Porchia (U.S. Pat. No. 6,994,335 B2) patented a disposable corrugated cutting surface similar to cardboard. This has defined areas of bending. However, it lacks handles and also has a wide discharge end.
6. The Sanders board (U.S. Pat. No. 5,203,548) incorporates a handle and a folding feature directed by means similar to the present proposed invention. Drawbacks included an irregular shape requiring either a smaller effective cutting surface or, with a standard size preparation area, increased length due the handle, requiring more storage space. The present invention retains a full-sized surface area. The Sanders board has a wide discharge area, offering little advantage over folding a standard cutting sheet.

It should be understood, of course, that the foregoing relates to exemplary embodiments of the invention and that modifications may be made without departing from the spirit and scope of the invention as set forth in the following claims.

What is claimed is:
1. An apparatus comprising:
a flat surface for cutting, crushing and other preparation of foods; said flat surface being a square or rectangular surface; said surface including folding lines on a first side being adjacent to each other and spaced apart extending in an angularly outward to a second side being more spaced apart than said spacing of said first side forming a trapezoid in a middle portion of said flat surface;
a second and third side portions each being a reverse trapezoid on each side of said trapezoid with a larger side of said reverse second and third trapezoid being on said first side of said flat surface and a smaller side of said reverse second and third trapezoid being on said second side of said flat surface; and handles apertures being in said second and third side portions of said reverse trapezoids wherein said apparatus forms openings for distribution of said food from either a small opening found at said first side and a larger opening found at said second side.
2. The apparatus of claim 1, further comprising a plastic material.

* * * * *